US012756993B2

(12) United States Patent
McKinnon

(10) Patent No.: US 12,756,993 B2
(45) Date of Patent: Oct. 6, 2026

(54) AUDIO SIGNAL ENCODING FOR DEVICE CONTROL OR CONTENT ACCESS IN TELECOMMUNICATIONS

(71) Applicant: Bandwidth Inc., Raleigh, NC (US)

(72) Inventor: Steve McKinnon, Cary, NC (US)

(73) Assignee: Bandwidth Inc., Raleigh, NC (US)

( * ) Notice: Subject to any disclaimer, the term of this patent is extended or adjusted under 35 U.S.C. 154(b) by 185 days.

(21) Appl. No.: 18/954,050

(22) Filed: Nov. 20, 2024

(65) Prior Publication Data

US 2025/0344046 A1 Nov. 6, 2025

Related U.S. Application Data

(62) Division of application No. 18/651,756, filed on May 1, 2024, now Pat. No. 12,192,863.

(51) Int. Cl.
*H04L 67/14* (2022.01)
*G10L 19/018* (2013.01)
*H04L 67/146* (2022.01)
*H04W 4/20* (2018.01)

(52) U.S. Cl.
CPC ............. *H04W 4/20* (2013.01); *G10L 19/018* (2013.01); *H04L 67/146* (2013.01)

(58) Field of Classification Search
CPC ....... H04W 4/20; G10L 19/018; H04L 67/146
See application file for complete search history.

(56) References Cited

U.S. PATENT DOCUMENTS

2012/0323995 A1 12/2012 Bourke et al.
2014/0039901 A1* 2/2014 Mosko .................... G10L 19/00 704/500
2024/0267460 A1* 8/2024 Marzorati ............. H04M 3/493
2025/0095662 A1* 3/2025 Looney ................. G10L 19/018

* cited by examiner

*Primary Examiner* — Michael T Vu
(74) *Attorney, Agent, or Firm* — Gregory Stephens

(57) ABSTRACT

Embodiments of the present disclosure provide techniques for improving interaction dynamics between users and telecommunications devices through the use of encoded audio signals. During a telecommunications session involving an interaction system and a telecommunications device, the interaction system can receive user inputs transmitted from the telecommunications device, obtain an encoded audio signal based on the user inputs, and transmit the encoded audio signal to the telecommunications device. The telecommunications device can decode the encoded audio signal to identify instructions for executing an operation and execute the operation in response to the instructions. Execution of the operation can be facilitated through a task coordinator of the telecommunications device.

20 Claims, 4 Drawing Sheets

AUDIO SIGNAL ENCODING FOR DEVICE CONTROL OR CONTENT ACCESS IN TELECOMMUNICATIONS

PRIORITY

This application is a divisional of U.S. application Ser. No. 18/651,756, filed on May 1, 2024, entitled "Audio Signal Encoding for Device Control or Content Access in Telecommunications," the entire contents of which is hereby incorporated herein by reference.

FIELD

The present disclosure generally relates to telecommunications and, more particularly, to communicating encoded audio signals to facilitate device control and content access.

BACKGROUND

Telecommunications platforms commonly serve as the bridge between entities, like businesses or organizations, and individuals, including users or callers. These platforms often feature interaction systems, which may vary from automated setups like Interactive Voice Response (IVR) systems to human-operated stations with customer service representatives or help desk personnel. The primary function of these systems or personnel is often to facilitate communication by addressing inquiries, providing information, or enabling various services, including appointment scheduling.

Interaction systems can be designed to simplify the user's access to specific content or services. For instance, in the process of scheduling an appointment over a phone call, the interaction system might send a text message including a link to the user's mobile device. Clicking this link directs the user to a webpage where they can select a convenient appointment time, thereby streamlining the interaction and enhancing the user experience.

SUMMARY

Embodiments of the present disclosure provide techniques for improving interaction dynamics between users and telecommunications devices through the use of encoded audio signals. An interaction system can obtain user inputs during a telecommunications session, obtain encoded audio signals based on these inputs, and transmit the encoded signals. A telecommunications device can receive these encoded audio signals, decode them to identify embedded instructions, and execute the corresponding operations, thereby facilitating enhanced interaction dynamics.

The present disclosure describes example systems, methods, and apparatuses improving interaction dynamics between users and telecommunications devices through the use of encoded audio signals. Some embodiments of the present disclosure provide a method during a telecommunications session involving an interaction system and a telecommunications device. The method can include receiving, by the telecommunications device, an encoded audio signal. The encoded audio signal can be associated with a predetermined operation. The method can include decoding, by the telecommunications device, the encoded audio signal to identify instructions for executing the predetermined operation; and executing the predetermined operation by the telecommunications device in response to the instructions. Execution of the predetermined operation can be facilitated through a task coordinator of the telecommunications device, without manual user intervention.

In some embodiments, the encoded audio signal can be representative of content access information. The encoded audio signal can include a set of tones, each tone representing a discrete element of the content access information. A sequential arrangement of the sequence of distinct audio tones can form a pattern corresponding to the content access information.

In some embodiments, the content access information corresponds to a Uniform Resource Locator (URL).

In some embodiments, the decoding can include identifying the content access information. Executing the predetermined operation can include launching a web browser on the telecommunications device and navigating to a web page associated with the content access information.

In some embodiments, the decoding can include recognizing application activation instructions. The executing the predetermined operation can include launching an application on the telecommunications device that corresponds to the application activation instructions.

In some embodiments, the predetermined operation can include adjusting at least one of configuration parameters associated with a mobile application installed on the telecommunications device or system settings of the telecommunications device.

In some embodiments, the decoding can include converting each tone of the set of tones into a corresponding element based on a predefined relationship between audio tones and elements, and assembling the elements to form the content access information.

In some embodiments, the encoded audio signal can be characterized by a first tone sequence selected from a set of predefined tone sequences. Each tone sequence each of the set of predefined tone sequences can be uniquely associated with a distinct predetermined operation from a set of predefined operations.

In some embodiments, the decoding can include: analyzing the first tone sequence to match it with a corresponding predetermined operation in a database of tone sequences; and identifying the predetermined operation as the corresponding predetermined operation.

In some embodiments, the predetermined operation can include at least one of launching a web browser, adjusting settings of the telecommunications device, launching an application installed on the telecommunications device, or initiating a download of an application for installation on the telecommunications device.

In some embodiments, the task coordinator can include an application running on the telecommunications device. The application can be configured to process encoded audio signals to execute predetermined operations based on the encoded audio signals.

In some embodiments, the interaction system generates the encoded audio signal in response to user inputs transmitted from the telecommunications device. The user inputs can be derived from at least one of voice commands or Dual-Tone Multi-Frequency signals.

In some embodiments, the method can include identifying the encoded audio signal by detecting at least one of a start identifier prior to the receiving the encoded audio signal or a stop identifier subsequent to the prior to the receiving the encoded audio signal.

In some embodiments, at least one of the start identifier or the stop identifier can be characterized by one or more of the following: a unique frequency tone distinct from the encoded audio signal; a predetermined pattern of tones; a predetermined duration of silence serving as a signal delimiter; a modulation in amplitude; a digital watermark embedded within an audio stream; a sequence of rapid pulses distinguishable by a decoding algorithm of the telecommunications device; or a shift in phase of an audio signal.

Some embodiments of the present disclosure provide non-transitory computer-readable media storing computer executable instructions that when executed by one or more processors cause the one or more processors to: monitor incoming audio during a telecommunications session for encoded audio signals; decode a detected encoded audio signal to identify instructions associated with a predetermined operation; and execute the predetermined operation in response to the identified instructions.

Some embodiments of the present disclosure provide a system for processing encoded audio signals during a telecommunications session. The system can include one or more processors and a non-transitory computer-readable storage medium storing computer-executable instructions that when executed by the one or more processors cause the one or more processors to: monitor incoming audio during a telecommunications session for encoded audio signals; decode a detected encoded audio signal to identify instructions associated with a predetermined operation; and execute the predetermined operation in response to the identified instructions.

Some embodiments of the present disclosure provide a method that includes during a telecommunications session involving an interaction system and a telecommunications device: receiving user inputs transmitted from the telecommunications device; and obtaining an encoded audio signal based on the user inputs. The encoded audio signal can be associated with a predetermined operation for execution by the telecommunications device. The method can include transmitting the encoded audio signal to the telecommunications device. The telecommunications device can decode the encoded audio signal to identify instructions for executing the predetermined operation and execute the predetermined operation in response to the instructions. Execution of the predetermined operation can be facilitated through a task coordinator of the telecommunications device.

In some embodiments, the obtaining can include generating the encoded audio signal using a sequence of tones from a catalog of predefined tone sequences. The sequence of tones can correspond to the predetermined operation.

In some embodiments, the obtaining can include accessing a database can include a plurality of encoded audio signals. Each encoded audio signal may be uniquely mapped to a predetermined operation. The obtaining can further include selecting the encoded audio signal from the database based on correlation with the user input.

In some embodiments, the encoded audio signal can be representative of content access information. The encoded audio signal can include a set of tones. Each tone can represent a discrete element of the content access information. A sequential arrangement of the sequence of distinct audio tones can form a pattern corresponding to the content access information.

In some embodiments, the content access information corresponds to a Uniform Resource Locator (URL).

In some embodiments, the predetermined operation can include adjusting at least one of configuration parameters associated with a mobile application installed on the telecommunications device or system settings of the telecommunications device.

In some embodiments, the user inputs can include at least one of voice commands or Dual-Tone Multi-Frequency signals.

In some embodiments, transmitting the encoded audio signal can include transmitting at least one of a start identifier before or a stop identifier after transmitting the encoded audio signal.

In some embodiments, at least one of the start identifier or the stop identifier can be characterized by one or more of the following: a unique frequency tone distinct from the encoded audio signal, a predetermined pattern of tones, a predetermined duration of silence serving as a signal delimiter, a modulation in amplitude, a digital watermark embedded within an audio stream, a sequence of rapid pulses distinguishable by a decoding algorithm of the telecommunications device, or a shift in phase of an audio signal.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

DETAILED DESCRIPTION

Figure 1:
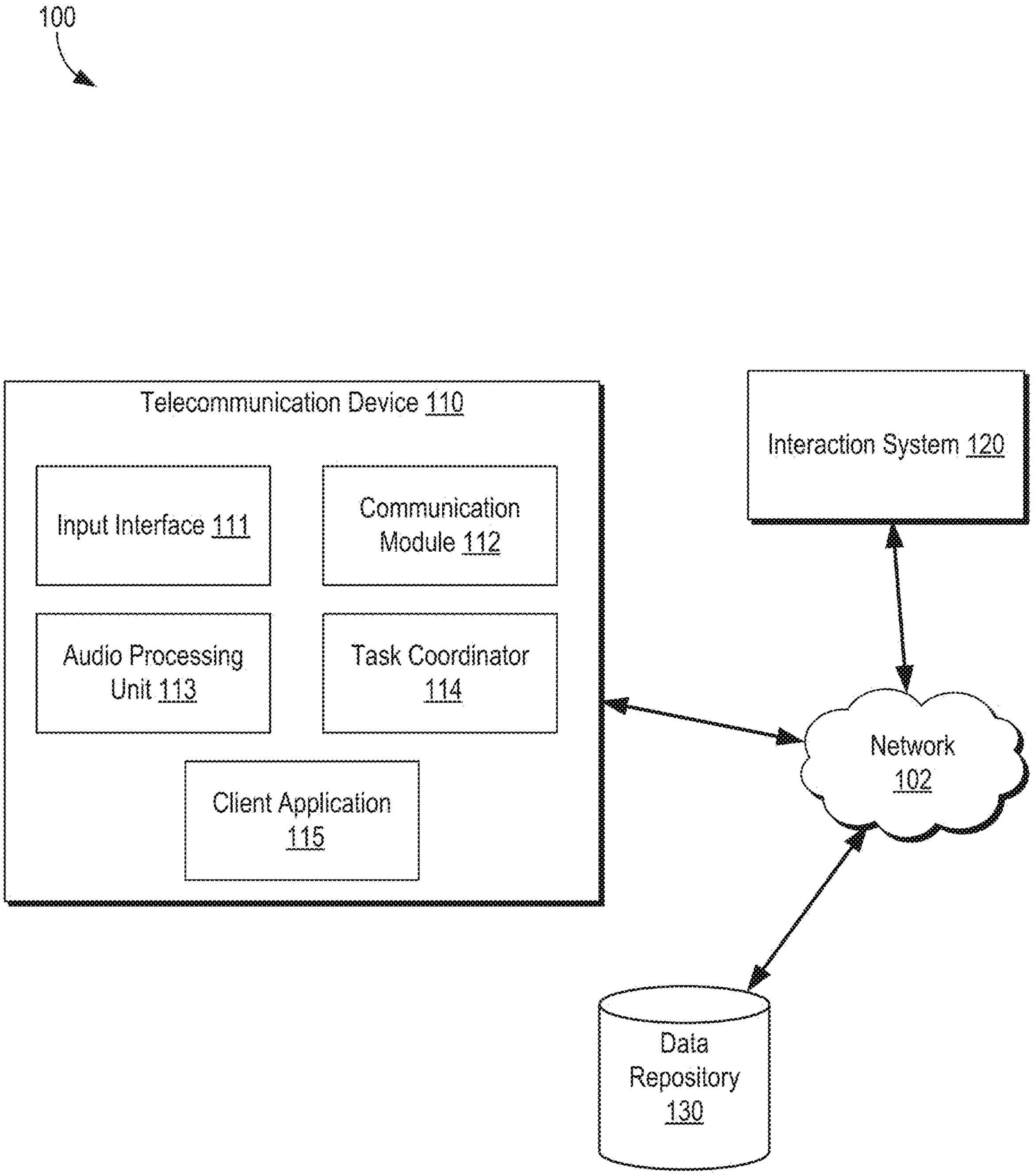
FIG. 1 illustrates a block diagram of an environment for improving interaction dynamics between users and telecommunications devices through the use of encoded audio signals.

Traditionally, user interaction with mobile devices within telecommunications systems has predominantly been manual, requiring direct input through interface navigation or command entry. This conventional method, while effective, lacks the convenience and fluidity expected in contemporary user experiences.

The inventive concepts discussed herein improve the interaction dynamics between users and telecommunications devices through the use of encoded audio signals. These signals can enable a diverse array of reactive operations on a user's device during a telecommunications session with an interaction system. Operations can include, but are not limited to, launching apps, adjusting device settings, accessing specific content or services, facilitating app downloads and installations, or the like. The interaction system can transmit an encoded audio signal to the telecommunications device, prompting the telecommunications device to perform a specific operation reactively, with or without manual input from the user. In some instances, the telecommunications device interprets the audio signal to execute embedded instructions. Alternatively, the telecommunications device may have preprogrammed responses to encoded signals, enabling automatic execution of operations upon signal detection. This streamlined process markedly enhances the user experience.

In some cases, the encoded audio signals disclosed herein can be akin to an QR Code. For example, much like a QR code encapsulates data within a visual pattern that can be scanned to retrieve information, the encoded audio signal can convey data in an auditory form. Thus, the encoded audio signal can carry complex instructions or content access details in a compact, encoded format that the telecommunications device can decode and act upon. In this way, the inventive concepts allows for the transmission of actionable data through sound waves, enabling a seamless and direct method of initiating device operations or accessing content without the need for visual interaction.

The inventive concepts discussed herein markedly improve user interactions with telecommunications devices, offering automated solutions across various scenarios. In help desk support, the encoded audio signals can be employed to configure settings or rectify issues on telecommunications device, circumventing the need for manual guidance. For scheduling tasks, encoded audio signals can facilitate direct access to calendar applications, efficiently presenting available time slots and simplifying the booking process. In customer service applications, the encoded audio signal can provide rapid aid with transactions, account adjustments, or inquiries, by executing the required operations autonomously. Moreover, in automated troubleshooting applications, encoded audio signals can swiftly diagnose and resolve common device problems, enhancing the efficiency of the troubleshooting process. By deploying encoded audio signals, these inventive concepts significantly boost operational efficiency and user satisfaction, reducing the reliance on direct user intervention for command execution.

In light of the description herein, it will be understood that the inventive concepts transform the way mobile devices operate within telecommunications environments, demonstrating a significant technological improvement. In particular, the inventive concepts substantially enhance the interactivity and responsiveness of mobile devices in telecommunications settings. These concepts enable interaction systems to generate and/or transmit encoded audio signals for an array of device control and content access tasks. Encoded audio signals facilitate direct execution of various operations like application launching, device setting adjustments, content navigation, or initiating downloads, all without necessitating much, if any, manual user input on the mobile devices. This advancement fosters a more integrated interaction between users and devices, boosting efficiency and enriching the user experience. Mobile devices, configured to decode or recognize these signals, can dynamically undertake a broad spectrum of commands, improving the telecommunications experience with versatility and robustness.

Thus, the presently disclosed embodiments represent an improvement at least in the enhancement in mobile and telecommunications device interaction. By enabling control and content access via encoded audio signals, the inventive concepts described herein introduce an improvement in how devices can be managed and how content is accessed, effectively circumventing the constraints tied to conventional manual input methods. The inventive concepts not only streamline the interaction process but also introduce techniques for facilitating complex operations, such as resolving issues typically addressed in helpdesk-like scenarios. For example, when contacting a support system with a specific problem, users can receive an audio signal that automatically adjusts settings or guides the device to the necessary resources, bypassing the need for step-by-step instructions. This capability represents a tangible advancement in the utility and efficiency of telecommunications systems, offering a direct, practical improvement in how devices interact with audio signals to execute a broad array of functions, thus setting a new benchmark for interactive technology.

The term "interaction system," as used herein, encompasses a broad range of technologies and methodologies aimed at facilitating and enhancing communication within telecommunications platforms. This includes fully automated interfaces like Interactive Voice Response (IVR) systems, platforms operated by human agents such as customer service representatives and help desk personnel, or hybrid systems that integrate both automated and human-operated elements. Such systems serve as conduits for interaction, bridging entities like businesses or organizations with individuals, whether they are users or callers.

The term "telecommunications session," as used herein, refers to an active engagement between two or more parties over a telecommunications network, encompassing a variety of communication forms and purposes. This can include voice calls, video calls, text messaging, or data transfers through various systems like cellular networks, internet-based communications, or traditional telephony. A telecommunications session can be facilitated by systems such as Interactive Voice Response (IVR) systems, customer service centers, advanced communication platforms that support real-time interactions, or the like. A telecommunications session can connect entities like businesses or organizations with individuals, allowing for the exchange of information, the conducting of transactions, the provision of services and support, or the like.

Although the disclosure generally describes audio signals and encoded audio signals, it will be appreciated that the concept can be applied to other types of signals as well. For example, the inventive concepts can extend to video data or video calls, where encoded signals are embedded within the video stream to convey instructions or information. Furthermore, the concept can extend to infrared signals for remote control applications, radio frequency (RF) signals for broader range wireless communication, or optical signals used in fiber optic and laser-based systems for high-speed data transmission. Additionally, haptic feedback mechanisms can convey encoded signals through patterns of vibration or motion, digital watermarking can embed data imperceptibly within images or audio, or magnetic signals can facilitate communication in near-field communication (NFC) or magnetic stripe card readers. These adaptations showcase the versatility of the inventive concept, enabling the transmission and decoding of encoded information to enhance interactivity and functionality across a wide spectrum of technologies and applications.

Environment Overview

FIG. 1 illustrates a block diagram of an environment 100 for improving interaction dynamics between users and telecommunications devices through the use of encoded audio signals. The environment 100 includes a telecommunications device 110, an interaction system 120, and a data repository 130 communicatively coupled via a network 102. To simplify discussion and not to limit the present disclosure, FIG. 1 illustrates only one telecommunications device 110, data repository 130, and network 102, though multiple may be used.

Any of the foregoing components or systems of the environment 100 may communicate via the network 102. Although only one network 102 is illustrated, multiple distinct and/or distributed networks 102 may exist. The network 102 can include any type of communication network, including RF (Radio Frequency) communication. For example, the network 102 can include, but is not limited to, local area networks (LAN), wide area networks (WAN), cellular networks across different generations (e.g., 3G, 4G LTE, 5G, HSPA, etc.), Bluetooth protocols, ad hoc networks, satellite networks, wired networks, or wireless networks, such as Internet Protocol (IP) networks. In some embodiments, the network 102 can include the Internet.

These components, the telecommunications device 110, the interaction system 120, and/or the data repository 130, can be realized through various computing devices, processors, or systems. They may operate in isolation, such as via virtual machines or containers, or utilize shared computing resources. Integration and operation can occur through a combination of software, firmware, and hardware designed to achieve the described functionality.

The telecommunications device 110 can be portable and can include, but is not limited to, a smartphone, tablet computer, handheld computer, laptop computer, desktop computer, wearable device, head mounted display, server, portable media player, gaming device, or the like. The telecommunications device 110 can include user interfaces like a button, microphone, or touchscreen for manual input, enabling users to launch applications, modify settings, navigate content, manage installations, etc. The telecommunications device 110 can support various client applications 115. For example, telecommunications device 110 can be compatible with a client application 115, which may include, but is not limited to, a web browser, a mobile application or "app," a background process that performs various operations with or without direct interaction from a user, or a "plug-in" or "extension" to another application, such as a web browser plug-in or extension. The telecommunications device 110 can include a processor configured to execute instructions.

The telecommunications device 110 can operate as a multifunctional endpoint in telecommunications networks, handling voice and/or video calls, messaging, data transmission, or access to online services. The telecommunications device 110 can process both standard and encoded signals, and can be configured to decode and execute instructions included in encoded audio signals during telecommunications sessions, enabling automated or semi-automated functionalities that streamline user interactions with the device. Encoded signals processed by the telecommunications device 110 can include embedded instructions or codes. The telecommunications device 110 can be configured to decode these signals, extract and execute the embedded instructions, or initiate preset actions in response to recognized codes. In this way, the telecommunications device 110 can be configured to handle encoded signals received during telecommunications sessions, executing operations based on the information included within the received signals.

The telecommunications device 110 can include an input interface 111, a communication module 112, an audio processing unit 113, a task coordinator 114, and a client application 115. The input interface 111 can facilitate user engagement with the telecommunications device 110 through mechanisms such as buttons, microphones, or touchscreens, which can facilitate manual input and interaction with functionalities of the telecommunications device 110. The input interface 111 can allow users to initiate telecommunications sessions (e.g., place audio or video calls), launch applications, adjust settings, navigate through content, manage installations and downloads, or the like.

The communication module 112 can facilitate the establishment of a telecommunications session, enabling the telecommunications device 110 to transmit and receive audio or other signals. The telecommunications session can serve as the conduit for the telecommunications device 110 to receive encoded audio signals, as described herein.

The audio processing unit 113 can decode audio or other signals transmitted over a telecommunications session. For example, during a telecommunications session, the audio processing unit 113 can obtain audio signals, identify encoded signals, or process the encoded audio signal conveyed via the telecommunications session. During (or after) telecommunications sessions, the audio processing unit 113 can extract instructions from encoded signals. In some cases, the audio processing unit 113 may have a predefined set of responses to certain codes or patterns within the audio signals. In some such cases, the audio processing unit 113 can recognize a specific code and trigger the execution of a preprogrammed operation. In some cases, the audio processing unit 113 is configured to record audio signals during telecommunications sessions. This recording capability can allow the unit to capture and store audio data, which can be processed either in real-time or subsequently to extract relevant information or instructions.

The task coordinator 114 can oversee the execution of operations correlating with decoded signals, encompassing functions like launching applications, adjusting device configurations, accessing specific content, and managing software installations to enhance the device's utility and user experience. In certain instances, the telecommunications device 110 executes these operations based on instructions processed by the audio processing unit 113, which acquires and deciphers audio signals to interpret information or extract directives. This processing can include responding to predefined signal codes or patterns, triggering automated operations that adjust functionality of the telecommunications device 110.

The task coordinator 114 can perform or cause performance of an operation that relates to the encoded signal. The operation can include any operation performable by the telecommunications device 110 including, but not limited to, launching applications, adjusting device settings, navigating to specific content, or managing downloads and installations. Launching applications can include, but is not limited to, opening software programs or mobile apps to perform specific tasks or access particular features on the telecommunications device 110. Adjusting device settings can include, but is not limited to, modifying various parameters such as network preferences, volume levels, screen brightness, or notification settings; managing security or privacy features such as granting access to the microphone, camera, photo library, or selectively granting or removing permissions to certain applications or users. Navigating to specific content can include, but is not limited to, accessing particular websites, files, or online services, such as to retrieve desired information or perform designated operations using the telecommunications device 110. Managing downloads and installations can include, but is not limited to, downloading new applications or software updates, or installing and configuring them on the telecommunications device 110.

The interaction system 120 can receive inputs, such as voice commands, touch selections, or text entries, from users during a telecommunications session with the telecommunications device 110 and can guide them through various processes and selections within telecommunications platforms. In addition or alternatively, the interaction system 120 manage interactions through either automated prompts or human assistance, and can facilitate device control and content access, by communicating encoded signals to the telecommunications device 110 during the telecommunications session.

The interaction system 120 determines which encoded signals to send based on input received from the user during the telecommunications session. For instance, the interaction system 120 may access a data store (e.g., the data repository 130) including instructions on translating user inputs into encoded audio signals. This process can include converting user requests into unique tone patterns that correspond to specific commands or operations.

In some cases, the interaction system 120 obtains the encoded audio signals to send by retrieving it from a database storing a set of available encoded audio signals. For example, the data repository 130 can store associations between a plurality of encoded audio signals and various user input. Upon receiving a user input, the interaction system 120 can identify and retrieve the corresponding encoded audio signal.

In some cases, the interaction system 120 can be configured to generate encoded audio signals based on specific user inputs. For example, the interaction system 120 can access translation instructions that allow for the conversion of user inputs, such as voice commands, touch selections, or text entries, into specific tone sequences or patterns representing distinct operations or commands.

The interaction system 120 can transmit the encoded audio signal to the telecommunications device 110. This transmission can allow the telecommunications device to perform actions such as decoding the signal to identify actionable information, verifying device configurations for the necessary permissions, or executing the decoded operation.

In some cases, as part of transmitting, the interaction system 120 embeds unique identifiers within the encoded audio signal to delineate its start and end, ensuring detection and processing by the telecommunications device 110. These start and stop identifiers can facilitate accurate transmission of information. When the telecommunications device 110 receives this signal, it decodes the embedded instructions and performs the corresponding operation. By streamlining the detection, decoding, and execution processes, the interaction system 120 significantly simplifies the user's interaction with their device during telecommunications sessions.

The data repository 130 can store various information for use by the telecommunications device 110, the interaction system 120, or another system. For example, the data repository 130 can store a plurality of patterns of tones that are linked or associated with a plurality of executable operations, establishing a relationship (e.g., a one-to-one relationship) between specific tone patterns and operations such as launching applications or adjusting device settings. Such a linkage can enable the telecommunications device 110 to interpret or determine the pattern and consults the data repository 130 to find the corresponding operation.

Consider a first scenario where a user contacts the support system of a telecommunications company without knowing the specific solution needed. The support system (i.e., the interaction system 120), through interactive dialogue and analysis of the user's situation, determines that downloading a particular productivity app would be beneficial. It then accesses the data repository 130 to retrieve the encoded audio signal associated with the app's download. This signal is transmitted to the user's telecommunications device 110, which decodes it and automatically proceeds with the download and installation of the specified app, streamlining the resolution process and enhancing user experience.

Consider a second scenario in which a user contacts a support system to schedule an appointment. The support system, after gathering necessary information from the user, determines that activating a specific scheduling webpage on the user's device would facilitate the appointment process. It then retrieves the encoded audio signal corresponding to the webpage activation from the data repository 130. This signal is transmitted to the user's telecommunications device 110, which decodes it and automatically launches the web browser, navigating directly to the scheduling webpage. This enables the user to easily schedule the appointment without manually searching for the website or navigating through various links, thus simplifying and expediting the process.

In some cases, the audio signal transmitted to the telecommunications device 110 may encapsulate direct executable commands, serving not merely as an identifier for associated operations but as an explicit set of instructions for execution. In some such cases, the data repository 130 may store decoding protocols which can provide instructions for the telecommunications device 110 to interpret and/or execute the instructions embedded within the audio signal. For example, upon reception of an encoded signal, the telecommunications device can consult the data repository 130 to determine how to decode the embedded instructions accurately and initiate the specified operations.

The data repository 130 can store information to enable the generation of encoded audio signals based on user inputs. For example, the data repository 130 can maintain associations between specific user inputs and corresponding tone patterns. These associations can allow the interaction system 120, for example, to identify and select the appropriate tone pattern to transmit to a user's telecommunications device in response to received user inputs. For instance, when a user selects number "9" on their keypad, this action can be associated with a unique tone pattern stored in the data repository 130. Upon receiving this input, the interaction system 120 can consult the data repository to find the specific tone pattern linked to the selection of number "9." This process can allow the interaction system 120 to identify and send a corresponding audio signal to the user's device, facilitating an efficient and targeted response to the user's input.

The data repository 130 can include instructions for generating tone patterns. For example, the instructions can detail a methodology for creating tone sequences that encapsulate specific commands or information, such as opening a designated URL in the device's web browser. The capability to dynamically generate tone patterns can be based on real-time user requests, which can enhance the flexibility and utility of the interaction system.

The data repository 130 can include or be implemented as cloud storage, such as Amazon Simple Storage Service (S3), Elastic Block Storage (EBS) or CloudWatch, Google Cloud Storage, Microsoft Azure Storage, InfluxDB, etc. The data repository 130 can be made up of one or more data stores storing data that has been received from one or more of the telecommunications device 110 or the interaction system 120. The data repository 130 can be configured to provide high availability, highly resilient, low loss data storage. The data repository 130 can include Amazon CloudWatch metrics. In some cases, to provide the high availability, highly resilient, low loss data storage, the data repository 130 can store multiple copies of the data in the same and different geographic locations and across different types of data stores (e.g., solid state, hard drive, tape, etc.). Further, as data is received at the data repository 130 it can be automatically replicated multiple times according to a replication factor to different data stores across the same and/or different geographic locations.

Operation Execution Through Encoded Audio Signal Processing

The interaction system 120 can advantageously control the telecommunications device 110 using encoded audio signals, which can be determined based on user inputs during a telecommunications session. The interaction system 120 can retrieve or create encoded audio signals, and upon transmission to the telecommunications device 110, these encoded audio signals can be decoded to execute the corresponding operations automatically, reducing the need for manual user interaction and enhancing the device's operational efficiency. Such techniques can advantageously reduce or eliminate the need for manual input by the user of the telecommunications device 110 to perform the operation, making the telecommunications device 110 more efficient and simplifying interactions.

Figure 2:
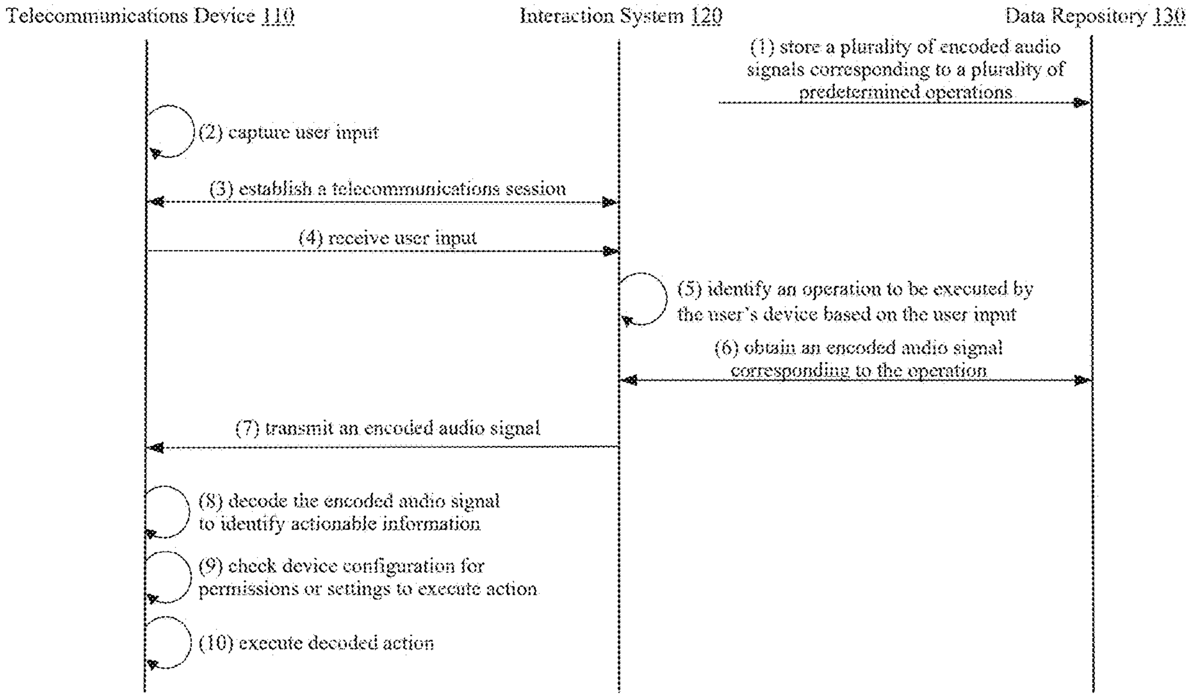
FIG. 2 illustrates a flowchart of a process for encoding and transmitting an audio signal within a telecommunications system, showing the steps from capturing user input to executing a decoded action.

FIG. 2 is a data flow diagram illustrating an embodiment of a process for encoding and transmitting an audio signal within a telecommunications system, which can involve various components like the telecommunications device 110, the interaction system 120, or the data repository 130. The data flow diagram of FIG. 2 illustrates an example of data flow and communications between the telecommunications device 110, the interaction system 120, and the data repository 130. However, it will be understood, that in some of embodiments, one or more of the functions described herein with respect to FIG. 2 can be omitted, performed concurrently or in a different order and/or performed by a different component of the environment 100. Accordingly, the illustrated embodiment and description should not be construed as limiting.

At (1), the data repository 130 can enable the interaction system 120 and/or the telecommunications device 110 to access and utilize various instructions or data mappings. This access may facilitate the retrieval and/or application of encoded audio signals, thereby supporting a streamlined and effective operational response within the telecommunications environment 100. The data repository 130 can store various types of data, including but not limited to, associations between user inputs, operations executed on the telecommunications device 110, and/or corresponding encoded audio signals. In some cases, the data repository 130 can maintain mappings that correlate specific encoded signals with their respective operations or instructions for execution on the device. In some cases, the data repository 130 can store instructions for generating encoded audio signals (e.g., for use by the interaction system 120), or for decoding encoded audio signals (e.g., for use by the telecommunications device 110).

At (2), the telecommunications device 110 can capture user input, which can include actions such as dialing a number or selecting an option to start a phone call, thereby initiating a telecommunications session with the interaction system 120. This input can serve as a command that establishes the telecommunications session, enabling further interaction between a user of the telecommunications device 110 and the interaction system 120.

At (3), a telecommunications session between the telecommunications device 110 and the interaction system 120 can be established, for example based on the user input. This setup can be initiated by either party, where, for example, the user's action at (2) of dialing into a system or selecting a call-back feature prompts the interaction system 120 to engage. In some scenarios, the interaction system 120 itself can proactively establish the telecommunications session, such as adding the telecommunications device 110 to a call queue with a scheduled call-back function.

At (4), the telecommunications device 110 captures (and/or the interaction system 120 receives) user input as part of the ongoing telecommunications session with the interaction system 120. The telecommunications device 110 can capture user inputs, which may include queries or commands, as part of an interactive process with the interaction system 120. These inputs could come in various forms, such as voice commands, digital touch interactions, or mechanical key entries, and can be used to direct the subsequent operations of the telecommunications device 110 and/or the interaction system 120. In some cases, the user input can serve as input during a back-and-forth exchange, such as in helpdesk-like scenarios, to fine-tune the understanding of the user's needs. In some cases, the user input can enable the interaction system 120 to determine or refine the user's needs, and may occur prior to the interaction system 120 advancing to obtain an encoded audio signal based on the user's needs or desires.

At (5), the interaction system 120 interprets the user input received from the telecommunications device 110. Based on the user input, the interaction system 120 can determine a suitable operation to be executed on the telecommunications device 110. As described herein, operations can include, but are not limited to, enabling access to services, modifying device settings, retrieving specific information, initiating a download, launching an application, or navigating to certain content.

At (6), the interaction system 120 obtains an encoded audio signal. In some cases, to obtain the encoded audio signal, the interaction system 120 retrieves the encoded audio signal from the data repository 130. As described herein, in some cases, the data repository 130 can store a plurality of predetermined encoded audio signals, and the interaction system 120 can retrieve the one(s) that corresponds to the user input and/or the determined desired operation. For example, the interaction system 120 can select the signal that matches or most closely corresponds to the user input or the desired operation. As a non-limiting example, if the user input indicates a request to schedule a haircut with a particular barber, the interaction system 120 can identify and retrieve a specific encoded audio signal from the repository that matches this request. In some such cases, this signal, when executed by the user's phone, directly opens the scheduling interface for the specified barber, allowing the user to choose their appointment time.

Alternatively, in some cases, the interaction system 120 may generate the encoded audio signal, rather than obtain it from a set of predetermined or pre-generated signals. For example, the interaction system 120 may have instructions stored thereon for how to generate the encoded audio signal based on the user input, or may retrieve the instructions from the data repository 130.

In some cases, the encoded audio signal can include a plurality of tones, and each tone can represent a specific command or datum. For example, a singular tone might symbolize an individual character or a cluster of characters encompassing letters, digits, or symbols. In some such cases, the consecutive arrangement of these tones can be decoded in sequence to ascertain the conveyed information. As a non-limiting example, the transmission of a URL via the encoded audio signal can include a plurality of tones, where each character or character set within the URL is represented by a corresponding tone.

In some cases, the encoded audio signal can include patterns formed by the arrangement of tones, or tone-burst, serving as a method of conveying the intended message. For example, rather than each tone representing a discrete element, the combination and sequence of tones can create unique patterns that encode specific information. For example, in the context of conveying a URL, the arrangement and/or pattern of tones can signify the characters and structure of the web address. In such cases, the telecommunications device may possess a mapping of these patterns to the corresponding URL or include instructions for decoding the patterns to extract the intended information accurately.

Dual-tone multi-frequency signaling (DTMF) is a telecommunication signaling system that uses a combination of two separate frequencies to represent digits, symbols, or commands. Each digit or symbol is represented by a unique combination of two frequencies, one from a low-frequency group and one from a high-frequency group, transmitted simultaneously. DTMF is widely used in various telecommunications systems, including telephone networks, interactive voice response (IVR) systems, and automated customer service systems. In some cases, the encoded audio signal can implement DTMF.

Analog modem tones, also known as audio frequency-shift keying (AFSK) tones, utilize variations in audio frequencies to encode digital data over telephone lines. These tones represent binary data through different frequency pairs. Typically, one frequency indicates a binary '1' and another frequency indicates a binary '0'. This method allows analog modems to convert digital signals from computers into audio tones that can be transmitted over the telecommunications network. In some cases, the encoded audio signal can implement analog modem tones.

Analog modem encoding involves the process of modulating digital signals into analog signals using specific encoding techniques, such as phase-shift keying (PSK) or amplitude modulation (AM). This encoding can facilitate transmitting data over telephone lines, where direct digital transmission is not possible. The encoded signal varies in phase, frequency, or amplitude to represent the digital data, enabling reliable data communication across analog networks. In some cases, the encoded audio signal can implement analog modem encoding.

At (7), the interaction system 120 transmits the encoded audio signal to the telecommunications device 110. In some cases, the interaction system 120 may employ techniques to facilitate the clear reception of the encoded audio signal by the telecommunications device 110. For example, the interaction system 120 can selectively mute one or both ends of the communication line, which can facilitate uninterrupted transmission of the encoded audio signal. In some cases, the telecommunications device 110 can be configured to silence or mute its speaker during the transmission of the encoded audio signal, effectively hiding the tones from the user.

In some cases, the interaction system 120 may employ techniques to delineate the transmission boundaries of the encoded audio signal. For example, the interaction system 120 may incorporate start or stop identifiers to the ends of the encoded audio signal. Either of these identifiers may serve as a distinctive marker to inform the telecommunications device 110 of the signal's onset and/or conclusion. The start identifier or the stop identifier can be characterized by one or more discernible attributes, such as, but not limited to, a unique frequency tone separate from the encoded audio signal, a predetermined pattern of tones, a specified duration of silence acting as a signal delimiter, a modulation in amplitude, digital watermarking within the audio stream, or a sequence of rapid pulses identifiable by a decoding algorithm of the telecommunications device. Such measures can enhance the efficiency and accuracy of signal reception and decoding processes.

In some cases, the encoded audio signal can be imperceptible to a user during the telecommunications session. For example, this can be accomplished by embedding the signals within an audio frequency range that is beyond human auditory perception, typically above or below the standard audible spectrum of 20 Hz to 20 kHz. Consequently, these signals can be transmitted and received without the user's conscious awareness.

At (9), the telecommunications device 110 decodes the encoded audio signal. As described herein, the encoded audio signal can encompass a set of elements such as tones, beeps, clicks, and musical notes. This set of elements can form a structured sequence or pattern that conveys specific information. For instance, the telecommunications device 110 can decode the encoded audio signal by mapping each element within the sequence to its corresponding operation or data. In some examples, the elements might represent digits or characters, allowing the device to construct a URL, executable instructions, or other content. In addition or alternatively, the set of elements can embody one or more patterns, where the telecommunications device 110 decodes the signal by interpreting these patterns to extract the intended URL, executable instructions, or other content, effectively translating the audio nuances into actionable outcomes.

At (10), the telecommunications device 110 assesses its configuration to ensure it has the necessary permissions or settings to execute the operation. This checkpoint can ensure that all system requirements are met and that the device is in the correct state to perform the operation safely and effectively.

At (11), upon confirming that all prerequisites are satisfied, the telecommunications device 110 proceeds to execute the decoded operation. This action can translate the user's initial input, as conveyed through the encoded audio signal, into practical execution, effectively completing the task as intended by the interaction system.

In certain embodiments, any of interactions (1)-(11) may be omitted. For example, in such embodiments, the data flow diagram of FIG. 2 can include only those steps relating to the retrieval of encoded audio signals and/or their processing, along with the management of data flow between the components. In some cases, the interaction system 120 may not be involved in generating new signals but instead focuses on selecting and transmitting the appropriate pre-existing encoded signals from the data repository 130. In some cases, interaction (11) is omitted.

Device Interaction Through Encoded Audio Signals

The inventive concepts described herein significantly improve the interaction dynamics between users and telecommunications devices through the use of encoded audio signals. These signals enable a range of responsive operations on a telecommunications device 110, such as launching applications, modifying device settings, accessing tailored content or services, or managing app installations, thus reducing or potentially eliminating the need for manual user intervention to perform the operations. The telecommunications device 110 can decode these signals to directly execute embedded instructions or to implement preset responses for certain encoded signals, which facilitates streamlined operation execution. Consequently, the inventive concepts described herein enrich the user experience by establishing a more dynamic and integrated interaction framework between telecommunications devices and their operational environments, significantly improving the efficiency of device control and content navigation.

The inventive concepts present substantial advantages across various embodiments, enhancing user interaction with telecommunications devices. As an example, in help desk support applications, the encoded audio signals can configure settings or resolve issues on the telecommunications device 110, obviating the need for manual guidance. As another example, for scheduling purposes, the encoded audio signals facilitate access and present available time slots in a calendar application, streamlining appointment bookings. In customer service applications, the encoded audio signals facilitates instantaneous assistance with transactions, account modifications, or service queries, directly executing these operations based on encoded commands. Furthermore, in automated troubleshooting scenarios, the encoded audio signals efficiently diagnoses and remedies common device problems through predetermined operations. These advancements collectively underscore the transformative potential of the inventive concepts, significantly improving operational efficiency and user satisfaction by minimizing the need for explicit instructions and manual interventions.

Figure 3:
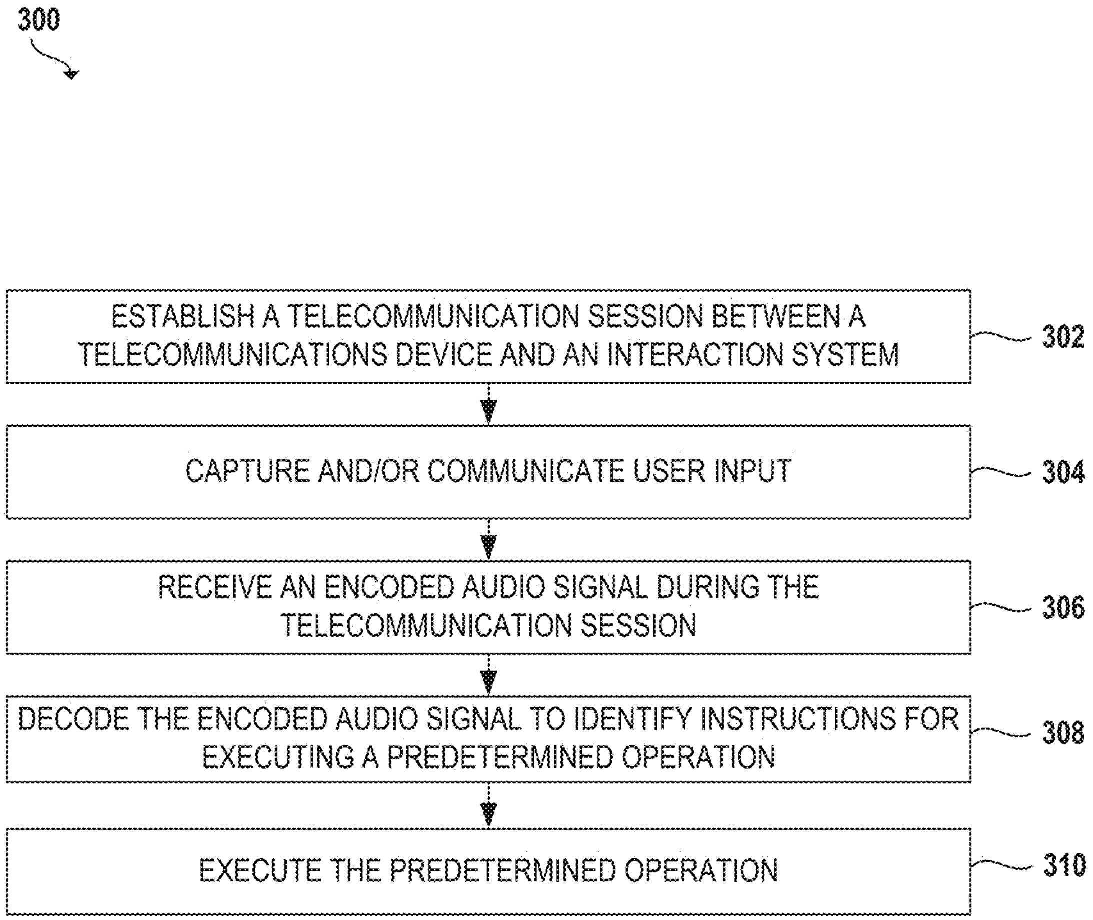
FIG. 3 is a flow diagram illustrative of an embodiment of a routine for receiving encoded audio signals and executing operations based on encoded audio signals during a telecommunications session.

FIG. 3 is a flow diagram illustrative of an embodiment of a routine 300, implemented by a telecommunications device 110, for receiving encoded audio signals and executing operations based on encoded audio signals during a telecommunications session. Although described as being implemented by the telecommunications device 110, it will be understood that one or more elements outlined for routine 300 can be implemented by one or more computing devices/components that are associated with the environment 100, such as, but not limited to, the interaction system 120 and/or the data repository 130. Thus, the following illustrative embodiment should not be construed as limiting.

At block 302, the telecommunications device 110 can initiate a telecommunications session with the interaction system 120. This initiation can occur when a user performs an action such as dialing a phone number associated with the interaction system 120, which can establish the telecommunications session. As described herein, the telecommunications session can serve as a mechanism for users to contact entities such as customer service or a help desk, enabling direct communication between the user and the interaction system 120.

Though described as being established by the telecommunications device 110, it will be appreciated that this setup can be initiated by either party. For example, this may be the case in scenarios such as customer service or help desk operations, where the interaction system 120 can activate the telecommunications session as part of a call-back feature for a particular service. This feature can connect users with the service, thereby streamlining the process of addressing user inquiries or issues.

At block 304, the telecommunications device 110 captures and communicates user input, which may come from various user actions, such as selections via touch interface, voice commands, or manual key entries. This input can initiate the subsequent processes within the telecommunications session, supporting an interactive flow between the user and the system.

At block 306, the telecommunications device 110 receives an encoded audio signal during the telecommunications session. The encoded audio signal can include elements like tones, beeps, clicks, musical notes, or any other form of audio signal. As described herein, the encoded audio signal can be representative of content access information, which can be usable by the telecommunications device 110 to execute various operations.

Content access information can refer to specific data encoded into audio signals that a telecommunications device can interpret and/or use to perform targeted actions automatically. The content access information can be encoded as a series of distinct audio tones, each representing different data elements like URLs or command instructions. For example, content access information can direct a device to a particular web page, activate specific applications, or adjust device settings based on the instructions embedded within the audio signal. Some examples of content access information include, but are not limited to, encoded audio signals that represent a Uniform Resource Locator (URL), which when decoded, prompts the device to launch a web browser and navigate directly to a specified webpage. In some cases, these audio signals can carry instructions to launch a particular application on the device, such as a calendar app to schedule an appointment, or to adjust system settings like Wi-Fi connectivity or display brightness, all without the user needing to manually input these commands.

In some cases, the telecommunications device 110 can identify the presence of the encoded audio signal by detecting the presence of at least one of a start identifier prior to the receiving the encoded audio signal or a stop identifier subsequent to receiving the encoded audio signal. The start and/or stop identifiers can be implemented using various mechanisms to signal the beginning or end of the encoded audio signal. These identifiers can include, but are not limited to, unique frequency tones that stand out from the main signal, specific patterns of tones designed to denote signal boundaries, predetermined durations of silence that act as clear separators, amplitude modulations that alter the signal's volume level to indicate transitions, digital watermarks embedded within the audio stream for security and identification, rapid pulse sequences that can be easily recognized by the device's decoding algorithm, or phase shifts in the audio signal to delineate the content. The start and/or stop identifiers can facilities the extraction and/or decoding of the entire encoded audio signal.

At block 308, the telecommunications device 110 decodes the encoded audio signal. As described herein, the encoded audio signal can encompass a set of elements such as tones, beeps, clicks, and musical notes. This set of elements can form a structured sequence or pattern that conveys specific information. For instance, the telecommunications device 110 can decode the encoded audio signal by mapping each element within the sequence to its corresponding operation or data. In some examples, the elements might represent digits or characters, allowing the device to construct a URL, executable instructions, or other content. In addition or alternatively, the set of elements can embody one or more patterns, where the telecommunications device 110 decodes the signal by interpreting these patterns to extract the intended URL, executable instructions, or other content, effectively translating the audio nuances into actionable outcomes.

In some cases, the telecommunications device 110 can access the data repository 130 to obtain the mappings for decoding the encoded audio signal. As described herein, the data repository 130 can store the relationships between the various audio elements and their corresponding operations or data, enabling the device to accurately translate the encoded signal into executable instructions or accessible content. By referencing these mappings, the telecommunications device 110 can ensure that each element of the audio signal is correctly interpreted.

At block 310, the telecommunications device 110 executes a predetermined operation. In some cases, the telecommunications device 110 executes the predetermined operation through its task coordinator 114, acting upon the decoded instructions. As described herein, the task coordinator 114 can serve as the intermediary between decoding the signal and performing the corresponding operations, facilitating the process with little or no manual user intervention. The task coordinator 114 can process decoded instructions, converting them into specific system operations such as launching applications, modifying settings, accessing content, or initiating communications. The task coordinator 114 may operate automatically, executing these operations based on the instructions without requiring manual user input, thereby streamlining the operational flow within the telecommunications device.

Fewer, more, or different blocks can be used as part of the routine 300. In some cases, one or more blocks can be omitted. For example, in some cases, the telecommunications device 110 verifies and enables permissions as part of executing the predetermined operation. For example, if the operation involves accessing sensitive user data or modifying system settings, the device ensures it has the appropriate user consents or system privileges. In some embodiments, the blocks of routine 300 can be combined with any one or any combination of blocks described herein with reference to at least FIG. 4.

Consider a first non-limiting example in which a user intends to schedule an appointment and dials into an IVR system. The IVR system prompts the user to select a service, such as scheduling an appointment, from the available options. Once the user makes this selection, the IVR system initiates the transmission of an encoded audio signal to the user's telecommunications device 110. This encoded audio signal includes a set of distinct tones, each representing a segment of data relating to completing a corresponding operation. In this example, the IVR system transmits a start identifier in the form of a signal that starts with a specific tone that the device recognizes as the beginning of an encoded message, followed by a sequence of tones that encode the operation instructions, and concludes with a stop identifier in the form of a tone signaling the end of the message.

Upon detecting the start tone, the telecommunications device 110 prepares to process the incoming information. The device decodes the sequence of tones to identify the operation to be performed, which, in this example, is launching a web browser and navigating to a specific URL for appointment scheduling. After the stop tone confirms the end of the encoded signal, the telecommunications device 110, through its task coordinator 114, automatically executes the operation. It opens the web browser and navigates to the appointment scheduling page, completing the operation initiated by the IVR's encoded audio signal without requiring further manual input from the user.

Consider a second non-limiting example where a user wants to activate a new feature on their telecommunications device 110, like setting up a virtual assistant. The user initiates a telecommunications session with the interaction system 120 by selecting the feature activation option on their device. The interaction system, after verifying the user's selection, sends an encoded audio signal specifically designed for this setup process from the data repository 130. The telecommunications device 110 receives this signal and proceeds to decode it, extracting the instructions for activating the virtual assistant feature. Following the decoding, the device automatically initiates the setup process, configuring itself to integrate the new virtual assistant without requiring the user to manually navigate through complex menus or settings. This not only streamlines the activation process but also ensures that the user can leverage new functionalities with minimal effort, directly enhancing the user experience.

Encoded Audio Signal Transmission in Telecommunications

As detailed herein, the interaction system 120 can translate user inputs during a telecommunications session into encoded audio signals that a telecommunications device 110 can interpret and act upon. In operation, the interaction system 120 can receive user input, process the user input, and determine an appropriate encoded audio signal that corresponds to the user input. The encoded signal can be transmitted to the telecommunications device 110, facilitating a variety of operations such as content access, device control, and more. By following a systematic protocol for encoding and signal transmission, the interaction system 120 can bolster the efficiency and accuracy of telecommunications interactions, reducing data processing errors, and maintaining the integrity and fluidity of the telecommunications session.

Figure 4:
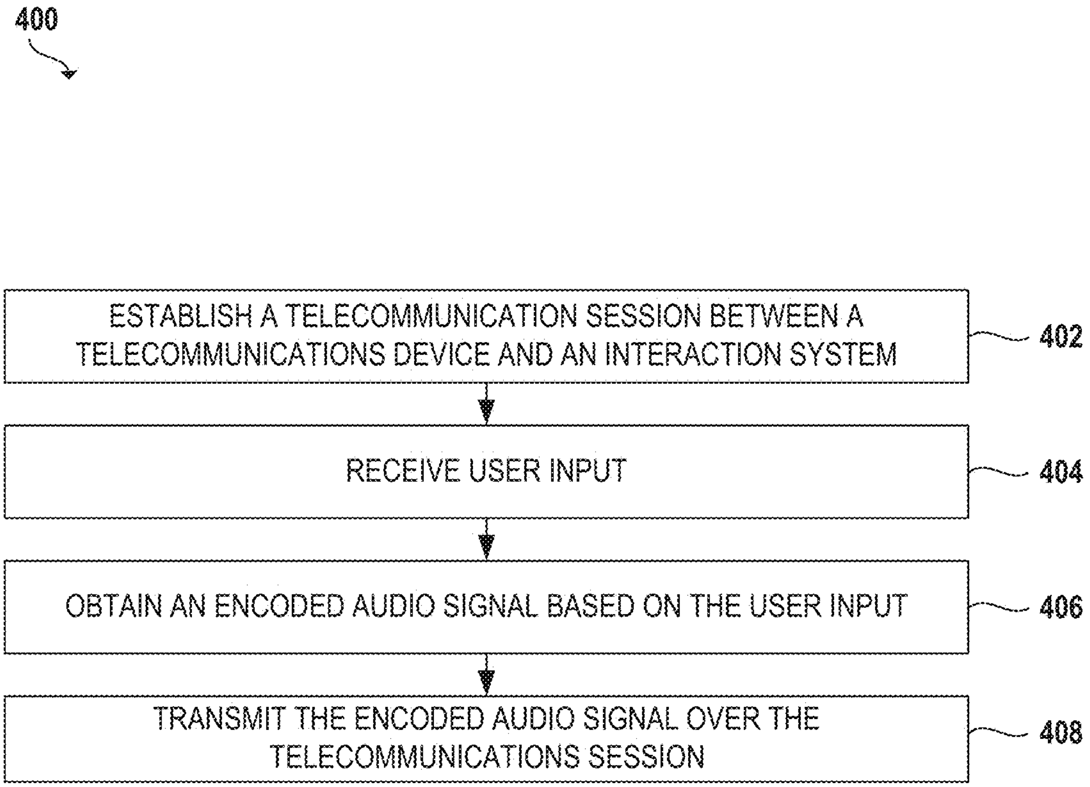
FIG. 4 is a flow diagram illustrative of an embodiment of a routine for obtaining and transmitting an encoded audio signal based on user input during a telecommunications session.

FIG. 4 is a flow diagram illustrative of an embodiment of a routine 400, implemented by an interaction system 120, for obtaining and transmitting an encoded audio signal based on user input during a telecommunications session. Although described as being implemented by the interaction system 120, it will be understood that one or more elements outlined for routine 400 can be implemented by one or more computing devices/components that are associated with the environment 100, such as, but not limited to, the telecommunications device 110 and/or the data repository 130. Thus, the following illustrative embodiment should not be construed as limiting.

At block 402, similar to block 302, a telecommunications session between a telecommunications device 110 and an interaction system 120 is established.

At block 404, similar to block 304, the interaction system 120 receives user input, which may be in the form of voice commands, digital selections, or other input methods. This input may be provided as At block 404, the interaction system 120 receives user input, which may be responsive to queries or commands from the interaction system 120, as part of an interactive process between the telecommunications device 110 and the interaction system 120. These inputs can come in various forms, such as voice commands, digital touch interactions, mechanical key entries, or the like. This interaction can resemble helpdesk-like situations, where the exchange of user input refines the understanding of user needs. Moreover, the user input can enable the interaction system 120 to determine or refine the user's needs before advancing to obtain an encoded audio signal based on the user's desires.

At block 406, the interaction system 120 obtains an encoded audio signal. As described herein, to obtain the encoded audio signal, the interaction system 120 may generate the signal or retrieve a pre-generated signal from the data repository 130.

At block 408, the interaction system 120 transmits the encoded audio signal to the telecommunications device 110.

Fewer, more, or different blocks can be used as part of the routine 400. In some cases, one or more blocks can be omitted. In some embodiments, the blocks of routine 400 can be combined with any one or any combination of blocks described herein with reference to at least FIG. 3.

Consider a scenario in which a user reaches out to a customer service center to report a technical issue with their device. The interaction system, upon receiving the user's detailed description of the problem, identifies that a specific settings adjustment on the user's device could resolve the issue. Following this determination, the interaction system accesses the data repository 130 to obtain the encoded audio signal designed for this settings adjustment. This signal, encapsulating the necessary instructions for the adjustment, is then transmitted from the interaction system to the user's telecommunications device 110. Upon receipt, the device decodes the signal and automatically applies the required settings change, rectifying the reported issue without necessitating manual navigation through the device's settings menus by the user, thereby streamlining the troubleshooting process.

Terminology

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may include, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method comprising:
- during a telecommunications session involving an interaction system and a telecommunications device:
  - receiving user inputs transmitted from the telecommunications device;
  - obtaining an encoded audio signal based on the user inputs, wherein the encoded audio signal is associated with an operation for execution by the telecommunications device; and
  - transmitting the encoded audio signal to the telecommunications device,
  - wherein the telecommunications device decodes the encoded audio signal to identify instructions for executing the operation and executes the operation in response to the instructions, wherein execution of the operation is facilitated through a task coordinator of the telecommunications device.

2. The method of claim 1, wherein the encoded audio signal is representative of content access information, wherein the encoded audio signal comprises a set of tones, each tone representing a discrete element of the content access information.

3. The method of claim 2, wherein a sequence of the set of tones forms a pattern corresponding to the content access information.

4. The method of claim 2, wherein the content access information corresponds to a Uniform Resource Locator (URL).

5. The method of claim 1, wherein the obtaining comprises generating the encoded audio signal using a sequence of tones from a catalog of predefined tone sequences, the sequence of tones corresponding to the operation.

6. The method of claim 1, wherein the obtaining the encoded audio signal comprises accessing a database comprises a plurality of encoded audio signals, each encoded audio signal being uniquely mapped to a operation, and selecting the encoded audio signal from the database based on correlation with the user input.

7. The method of claim 1, wherein the operation comprises adjusting at least one of configuration parameters associated with a mobile application installed on the telecommunications device or system settings of the telecommunications device.

8. The method of claim 1, wherein the user inputs comprise at least one of voice commands or Dual-Tone Multi-Frequency signals.

9. The method of claim 1, transmitting the encoded audio signal comprises transmitting at least one of a start identifier before or a stop identifier after transmitting the encoded audio signal.

10. The method of claim 9, wherein at least one of the start identifier or the stop identifier is characterized by one or more of the following:
- a unique frequency tone distinct from the encoded audio signal,
- a predetermined pattern of tones,
- a predetermined duration of silence serving as a signal delimiter,
- a modulation in amplitude,
- a digital watermark embedded within an audio stream,
- a sequence of rapid pulses distinguishable by a decoding algorithm of the telecommunications device, or
- a shift in phase of an audio signal.

11. The method of claim 1, wherein the encoded audio signal includes a start identifier, the start identifier configured to signal the telecommunications device to begin decoding a subsequent encoded audio signal.

12. The method of claim 11, wherein the start identifier comprises a unique signal characteristic selected from a predefined frequency, tone sequence, or amplitude modulation.

13. The method of claim 1, wherein the encoded audio signal includes a stop identifier, the stop identifier configured to signal the telecommunications device to terminate a decoding process and treat a preceding encoded audio as complete.

14. The method of claim 13, wherein the stop identifier comprises a predefined signal pattern selected from a sequence of silence, frequency shift, or rapid pulse tones.

15. The method of claim 1, wherein the obtaining the encoded audio signal comprises generating the encoded audio signal by converting the user inputs into a sequence of audio tones using an algorithmic mapping process, wherein each tone corresponds to a specific instruction or data element associated with the operation.

16. The method of claim 1, wherein obtaining the encoded audio signal comprises identifying a predefined tone sequence by referencing a mapping that associates the user input with one or more tone sequences, the mapping being stored in a database accessible to the interaction system.

17. The method of claim 1, wherein the operation is a predetermined operation.

18. The method of claim 1, wherein the operation is not predetermined and is dynamically determined based on an analysis of the user inputs during the telecommunications session.

19. Non-transitory computer-readable media storing computer executable instructions that when executed by one or more processors cause the one or more processors to:
- receive user inputs transmitted from a telecommunications device;
- obtain an encoded audio signal based on the user inputs, wherein the encoded audio signal is associated with a predetermined operation for execution by the telecommunications device; and
- transmit the encoded audio signal to the telecommunications device,
- wherein the telecommunications device decodes the encoded audio signal to identify instructions for executing the predetermined operation and executes the predetermined operation in response to the instructions, wherein execution of the predetermined operation is facilitated through a task coordinator of the telecommunications device.

20. A system for processing encoded audio signals during a telecommunications session, comprising:

one or more processors;

a non-transitory computer-readable storage medium storing computer-executable instructions that when executed by the one or more processors cause the one or more processors to:

receive user inputs transmitted from a telecommunications device;

obtain an encoded audio signal based on the user inputs, wherein the encoded audio signal is associated with a predetermined operation for execution by the telecommunications device; and transmit the encoded audio signal to the telecommunications device, wherein the telecommunications device decodes the encoded audio signal to identify instructions for executing the predetermined operation and executes the predetermined operation in response to the instructions, wherein execution of the predetermined operation is facilitated through a task coordinator of the telecommunications device.

* * * * *